US008640877B1

(12) United States Patent
Pastorius

(10) Patent No.: US 8,640,877 B1
(45) Date of Patent: Feb. 4, 2014

(54) POLLEN SEPARATOR

(76) Inventor: Elijah B. Pastorius, Denver, CO (US)

(*) Notice: Subject to any disclaimer, the term of this patent is extended or adjusted under 35 U.S.C. 154(b) by 293 days.

(21) Appl. No.: 13/042,117

(22) Filed: Mar. 7, 2011

(51) Int. Cl.
B03B 7/00 (2006.01)

(52) U.S. Cl.
USPC .............. 209/44; 209/3; 209/17; 209/420; 210/95; 210/258; 210/385

(58) Field of Classification Search
USPC ................ 209/13, 17, 18, 194; 210/258
See application file for complete search history.

(56) References Cited

U.S. PATENT DOCUMENTS

| | | | | |
|---|---|---|---|---|
| 2,774,479 | A * | 12/1956 | Cummings | 210/385 |
| 3,391,789 | A * | 7/1968 | Crain et al. | 210/95 |
| 3,606,092 | A * | 9/1971 | Kollmai | 222/144.5 |
| 5,287,975 | A * | 2/1994 | Chumley et al. | 209/3 |
| 5,421,461 | A * | 6/1995 | Ruzic | 209/44 |
| 6,663,773 | B1 * | 12/2003 | Rickett et al. | 210/258 |
| 7,093,719 | B2 * | 8/2006 | Roper | 209/420 |

OTHER PUBLICATIONS http://www.tamisiumextractors.com/ Tamisium Extractors, article on "A Superior Way to extract botanicals and essential oils", pp. 1-3, dated Feb. 11, 2011.
http://www.edenlabs.org/supercritical_extraction.html Eden Labs LLC, article on SuperCritical/Subcritical CO2.. Extraction, pp. 1-5, dated Feb. 11, 2011.
http://www.bubblebag.com/bubblenow.php "Bubble Now", advertisement, p. 1 of 1.
http://www.bubblebag.com/bubblebag.php, "BubbleBags", advertisement, p. 1 of 1.

* cited by examiner

Primary Examiner — Terrell Matthews
(74) Attorney, Agent, or Firm — Patent Law Offices of Rick Martin, P.C.

(57) ABSTRACT

Marijuana and other raw plant material such as corn is processed via a water and ice agitation method. Small diameter mixtures of plant pollen and plant debris are filtered from eight various micron filters, the filters used are 220, 190, 160, 120, 90, 73, 45 and 25 micron.
The agitator tub agitates screen bags holding raw plant material and ice, to break down various parts of the plant into a process water solution. This solution is pumped back and forth between two process reservoirs, each supports two strainer columns. Each strainer column has a pair of buckets. Each bucket has a different micron filter bag supported in it. An operator can recycle the solution any number of times to achieve a desired harvest of eight (or more or less) varying diameter pollen and debris product, using one agitator drain pump and three reservoir pumps.

19 Claims, 13 Drawing Sheets

Plants and Ice

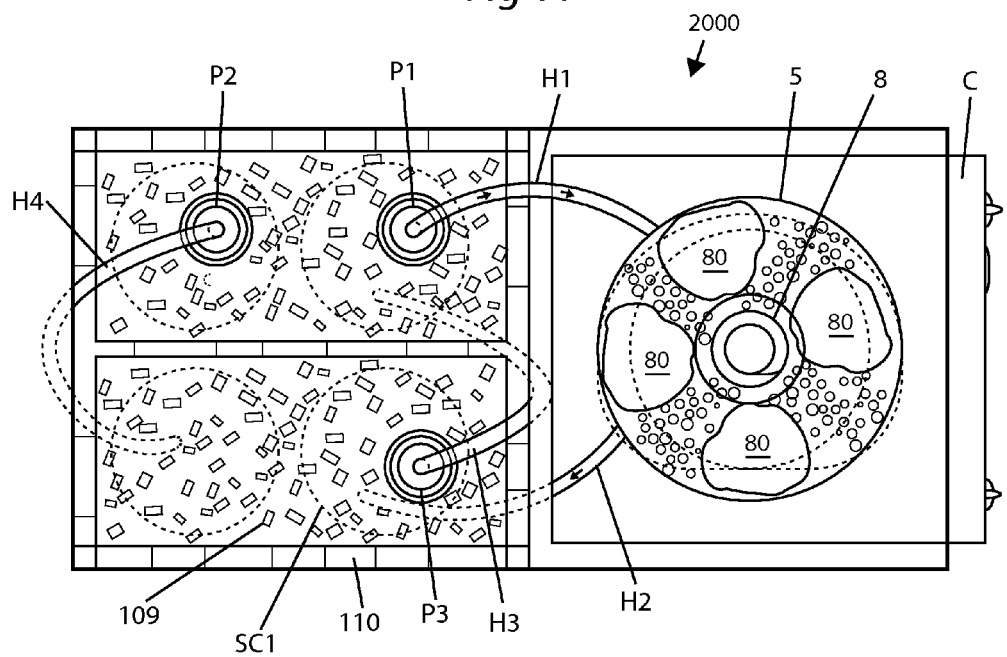
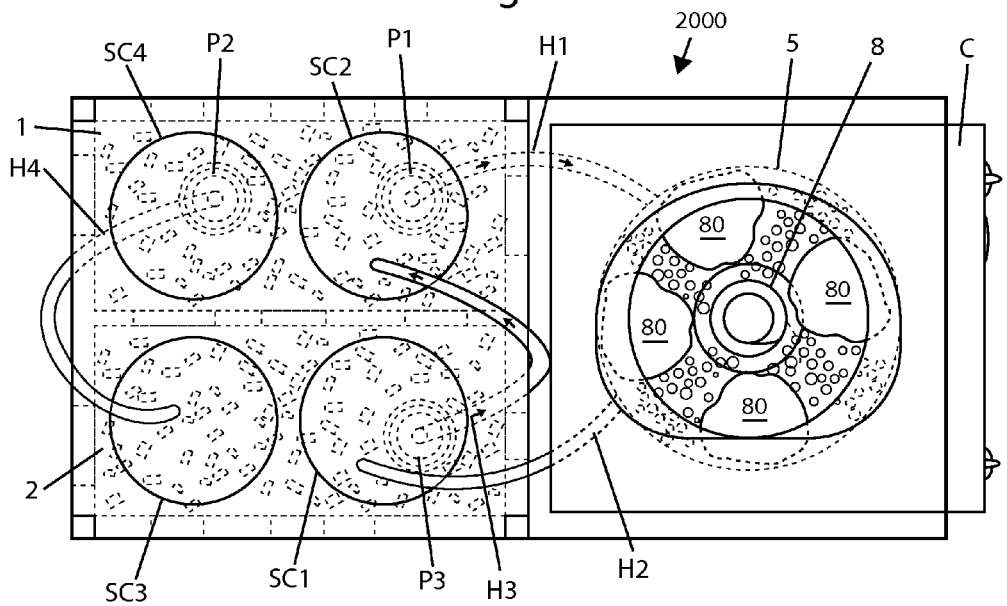

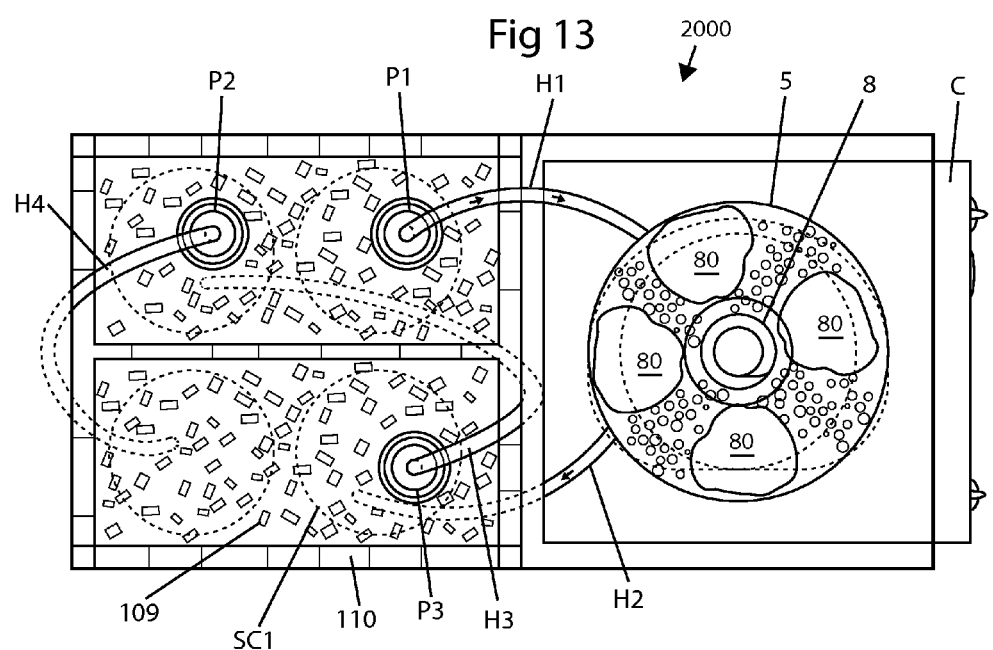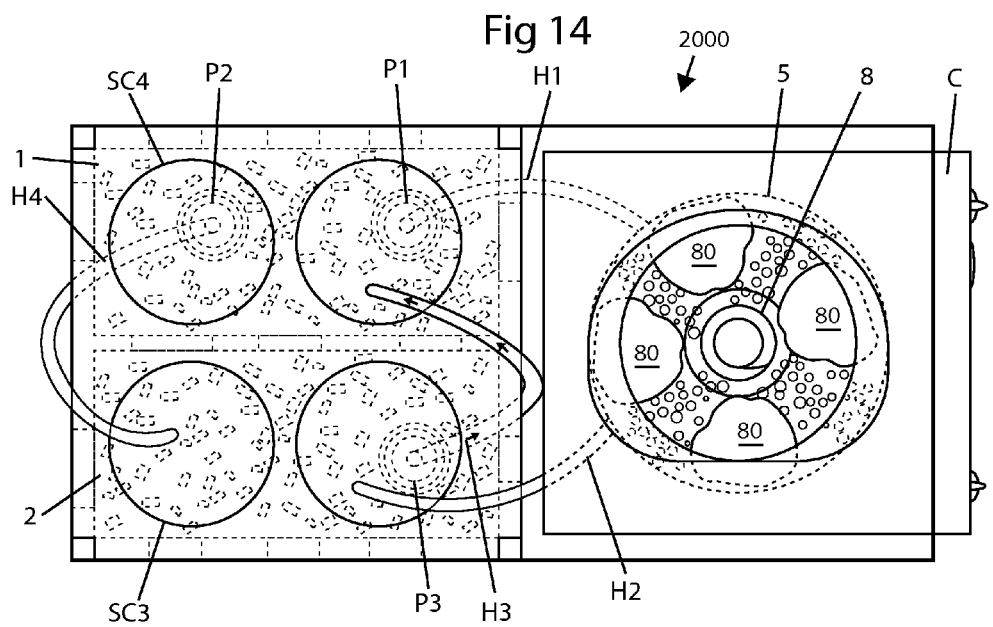

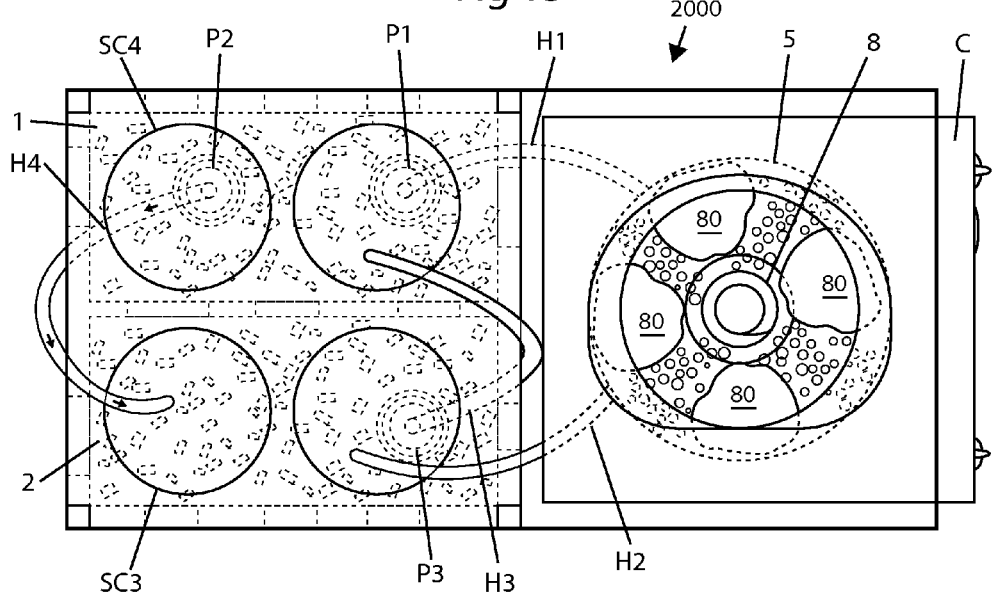
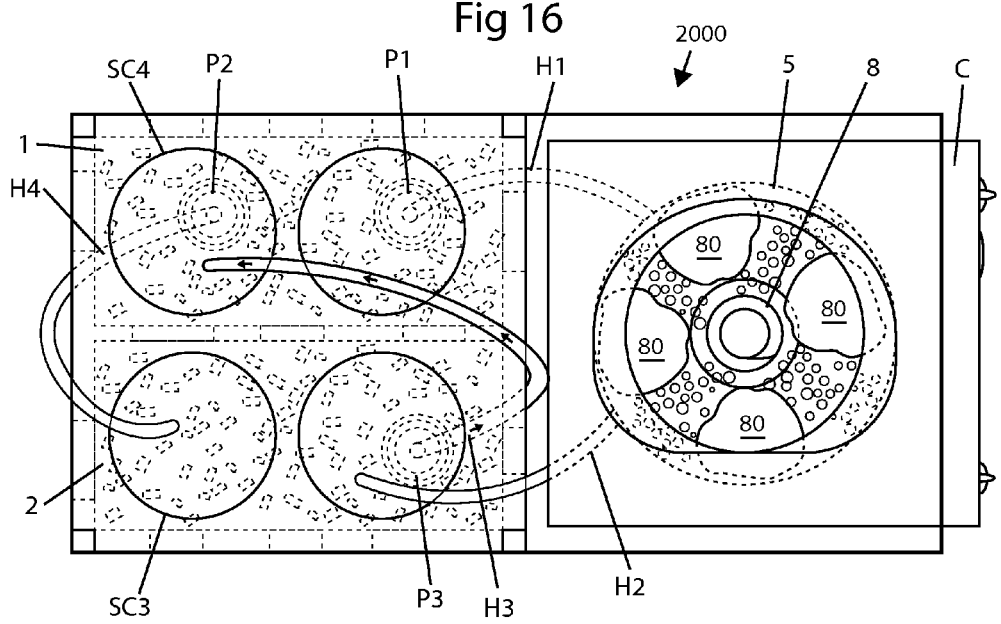

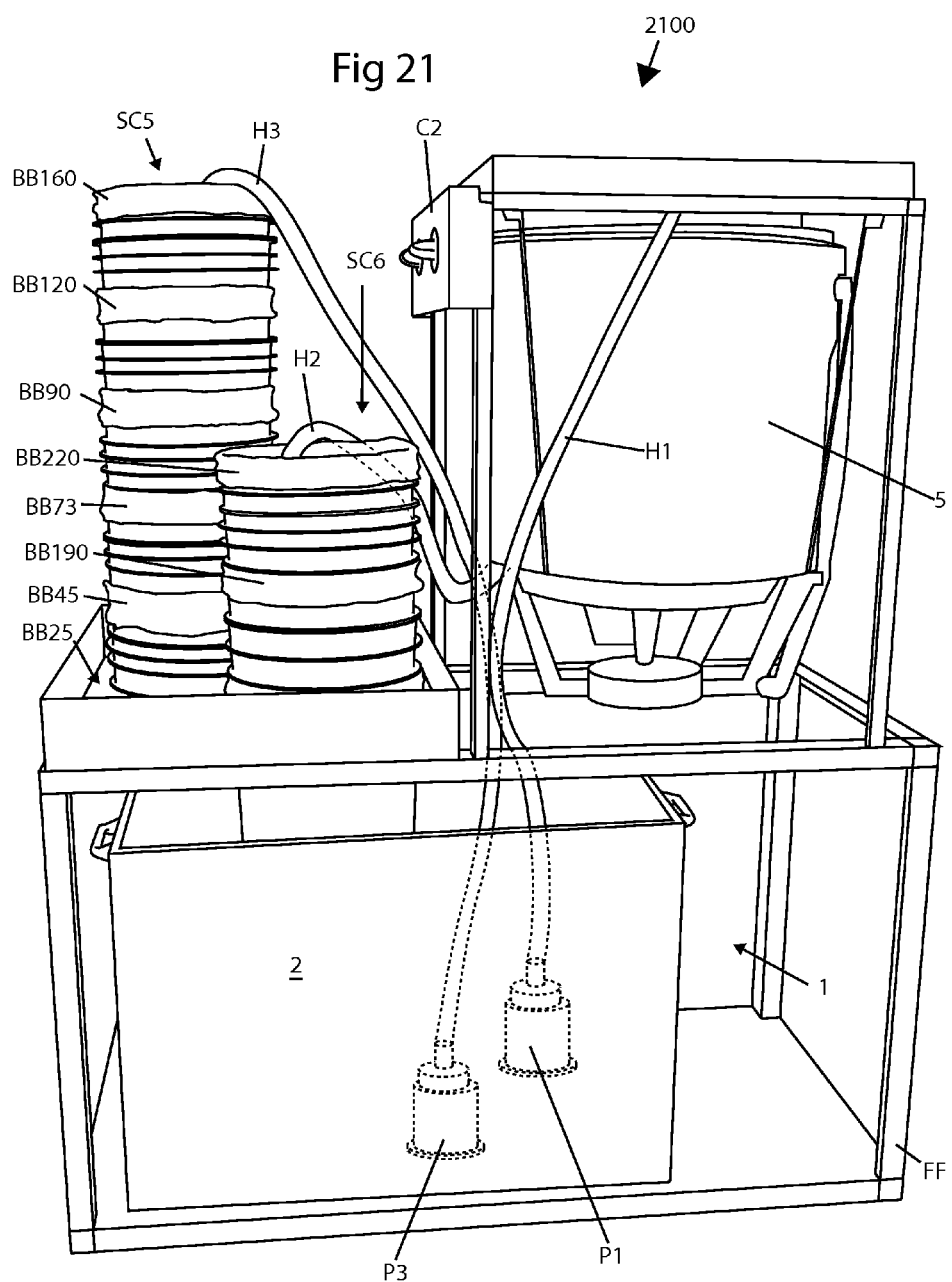

POLLEN SEPARATOR

FIELD OF INVENTION

The present invention relates to processing raw plant materials such as marijuana or corn through an agitator to filter out the plants pollen.

BACKGROUND OF THE INVENTION

Pollen (From Wikipedia, the Free Encyclopedia)

Pollen is a fine to coarse powder containing the micro gametophytes of seed plants, which produce the male gametes (sperm cells). Pollen grains have a hard coat that protects the sperm cells during the process of their movement between the stamens to the pistil of flowering plants or from the male cone to the female cone of coniferous plants. When pollen lands on a compatible pistil of flowering plants, it germinates and produces a pollen tube that transfers the sperm to the ovule of a receptive ovary. The individual pollen grains are small enough to require magnification to see detail.

The Structure and Formation of Pollen

Pollen itself is not the male gamete. Each pollen grain contains vegetative (non-reproductive) cells (only a single cell in most flowering plants but several in other seed plants) and a generative (reproductive) cell containing two nuclei: a tube nucleus (that produces the pollen tube) and a generative nucleus (that divides to form the two sperm cells). The group of cells is surrounded by a cellulose-rich cell wall call the intine, and a resistant outer wall composed largely of sporopollenin called the exine. Pollen grains come in a wide variety of shapes (most often spherical), sizes and surface markings characteristic of the species.

In Humans

A variety of producers have started selling pollen for human consumption, often marketed as a food (rather than a dietary supplement). The largest constituent is carbohydrates, with protein content ranging from 7 to 35 percent depending on the plant species collected by bees.

The U.S. Food and Drug Administration (FDA) has not found any harmful effects of pollen consumption, except from the usual allergies.

In New Mexico, corn pollen is very popular as a food additive. Since 3000 B.C. marijuana pollen has been used as a hallucinogen and medicine. The mind altering compound is called THC. The highest concentration of THC in marijuana is in the pollen in the flower. Some THC exists in the water leaf and sugar leaf as well.

Known in the art is the process to isolate pollens of corn, marijuana and many plants using an ice agitation method. Hashish is a concentrated form of marijuana made as follows.

Hashish can be expensive but like everything else in cannabis cultivation, it can be an investment that pays for itself. After a harvest, there are typically many green leaves-particularly large shade leaves that cannot be smoked-but have, over time, collected many fallen trichomes. Rather than letting them go to waste, they are frozen for 24 hours then agitated in ice water in a 5 gallon bucket lined with a succession of bags having decreasing screen sizes that capture the plant matter and allow the trichomes to pass down to the bottom bag where they collect into wet paste. The paste is pressed between its screen and a clean absorbent towel to extract water from the paste until it has the texture of clay. The clay (hash) is then shaped, sold, and smoked. This type of processing creates hashish called "bubble hash". "Bubble hash" is so named because of bubbles released (sometimes) as it burns. Pre-freezing the trim for 24 hours reduces bubbling by stiffening and hardening the trichomes. This prevents the trapping of water molecules when the trichomes separate from leaf matter (imagine icicles breaking off a frozen tree branch). The lack of using pre-frozen trim reduces the quantity of trichome separation and it increases the likelihood of "burning bubbles".

There are four main extraction types for the marijuana plant. They are water, butane, CO2 and alcohol. Let's start with alcohol. The parts of the plant that can be used for this extraction are the water leaf, sugar leaf, and the flowers. Each part or a combination of any parts are submerged in alcohol. They are soaked in alcohol until the pollen is dissolved off the plant. The plant parts are then filtered out and the alcohol is reduced down to a pollen oil.

The next process is butane. The parts of the plant can be used for this extraction are the water leaf, sugar leaf and the flowers. Each part or a combination of any parts are put into a tube and pressurized with butane. The pressurized butane is used to strip pollen from the plant and dissolve it into a pollen oil.

The next process is Co2. The parts of the plant that can be used for this extraction are the water leaf, sugar leaf and the flowers. Each part or a combination of any parts are put into a highly pressurized vessel and the Co2 is used to strip pollen from the plant and dissolve it into a pollen oil.

The next process is water extraction. Each part or a combination of any parts are put into a vessel with water and ice. The ice is agitated in water and knocks off the pollen from the plant.

The legalization of medicinal marijuana has created the need to process marijuana plants using the water extraction method in large volumes. What is needed in the art is an apparatus and method to form hashish from five pound or more from chunks of dried marijuana plants quickly using a semi-automated process.

The present invention provides an agitator system using ice and a series of strainers to isolate a variety of pollen fragments having differing millimeter diameters.

The closest known prior art is the commercially available Bubble How™ XL twenty gallon agitator. A tub has a powered two speed agitator and a drain pump. It holds a 220 micron all screen zipper bag that is filled with raw plant material and ice. In order to harvest eight varying diameter pollen extracts, the user must spread eight buckets across the floor, each with a different diameter screen. The Bubble Now XL agitator would run a cycle into the first bucket. Then the user must hand carry the first bucket into the second bucket. This process is repeated seven times. It is slow and labor intensive.

What is needed in the art is a more automated bulk processor. The present invention uses two receiving reservoirs and a powered agitator. All recycling of processed water is done with three submerged pumps. All eight strainer buckets are mounted on a frame with the agitator and two reservoirs.

SUMMARY OF THE INVENTION

The main aspect of the present invention is to provide a repetitive cycle of ice agitation and subsequent filtration of a plant mulch to isolate a series of varying diameter plant pollens and debris from the raw plant.

Another aspect of the present invention is to provide a portable system on a frame with casters.

Another aspect of the present invention is to provide motorized agitation of the ice using conventional washing machine technology.

Another aspect of the present invention is to use two recycle reservoirs and three pumps to handle all recycling of the processed fluids.

Another aspect of the present invention is to provide at least eight filters providing at least eight diameters of filtered plant matter.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 11 is a top plan view of the system shown in FIG. 9 starting the processing.

FIG. 12 is the same view of FIG. 11 in step three of the processing.

FIG. 13 is the same view as FIG. 11 in step three of the processing.

FIG. 14 is the same view as FIG. 11 in step four of the processing.

FIG. 15 is the same view as FIG. 11 in step five of the processing.

FIG. 16 is the same view as FIG. 11 in step six of the processing.

FIG. 21 is a side perspective view of an alternate embodiment two stacks of buckets system.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
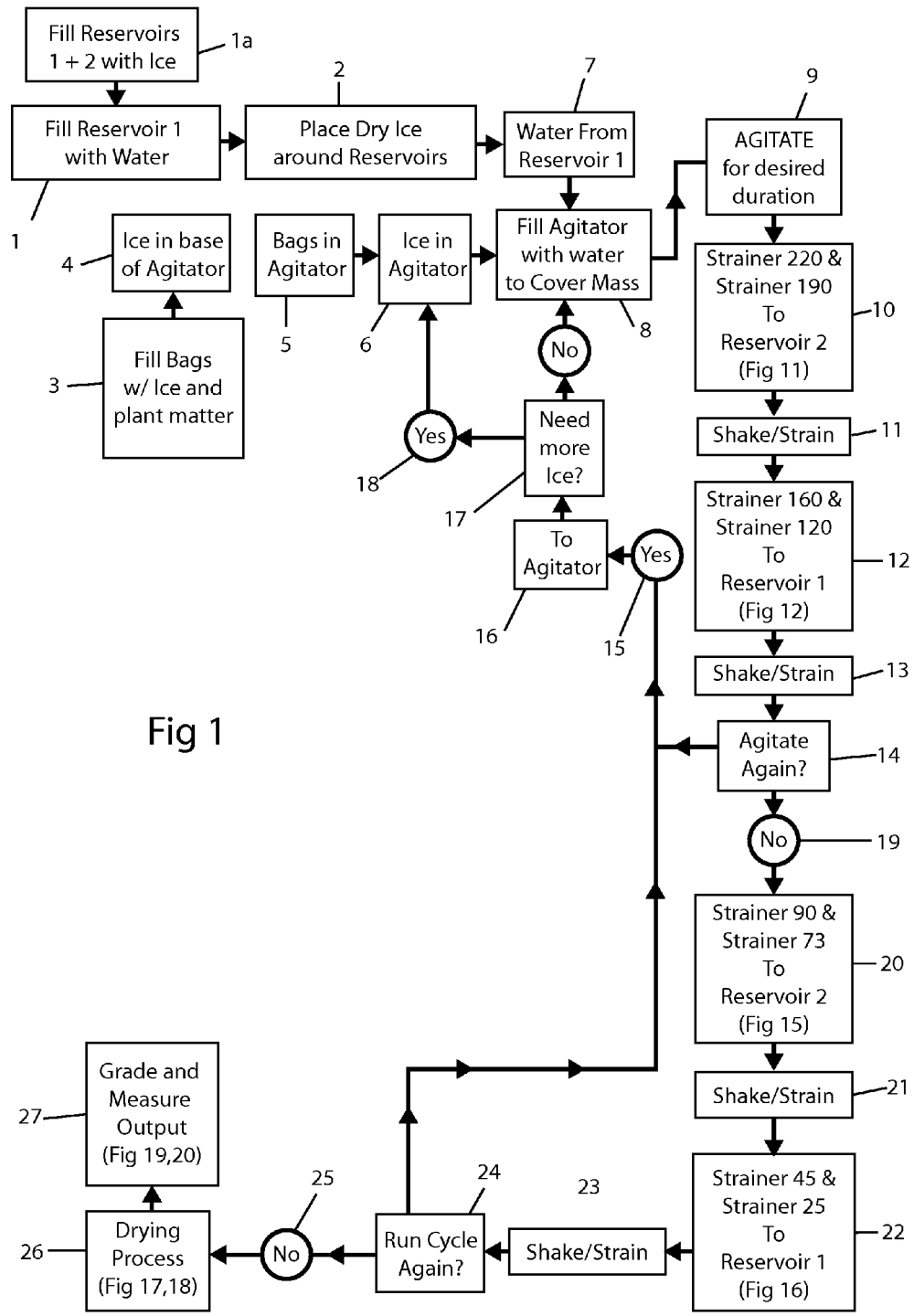
FIG. 1 is a flowchart depicting the agitation process.
Figure 2:
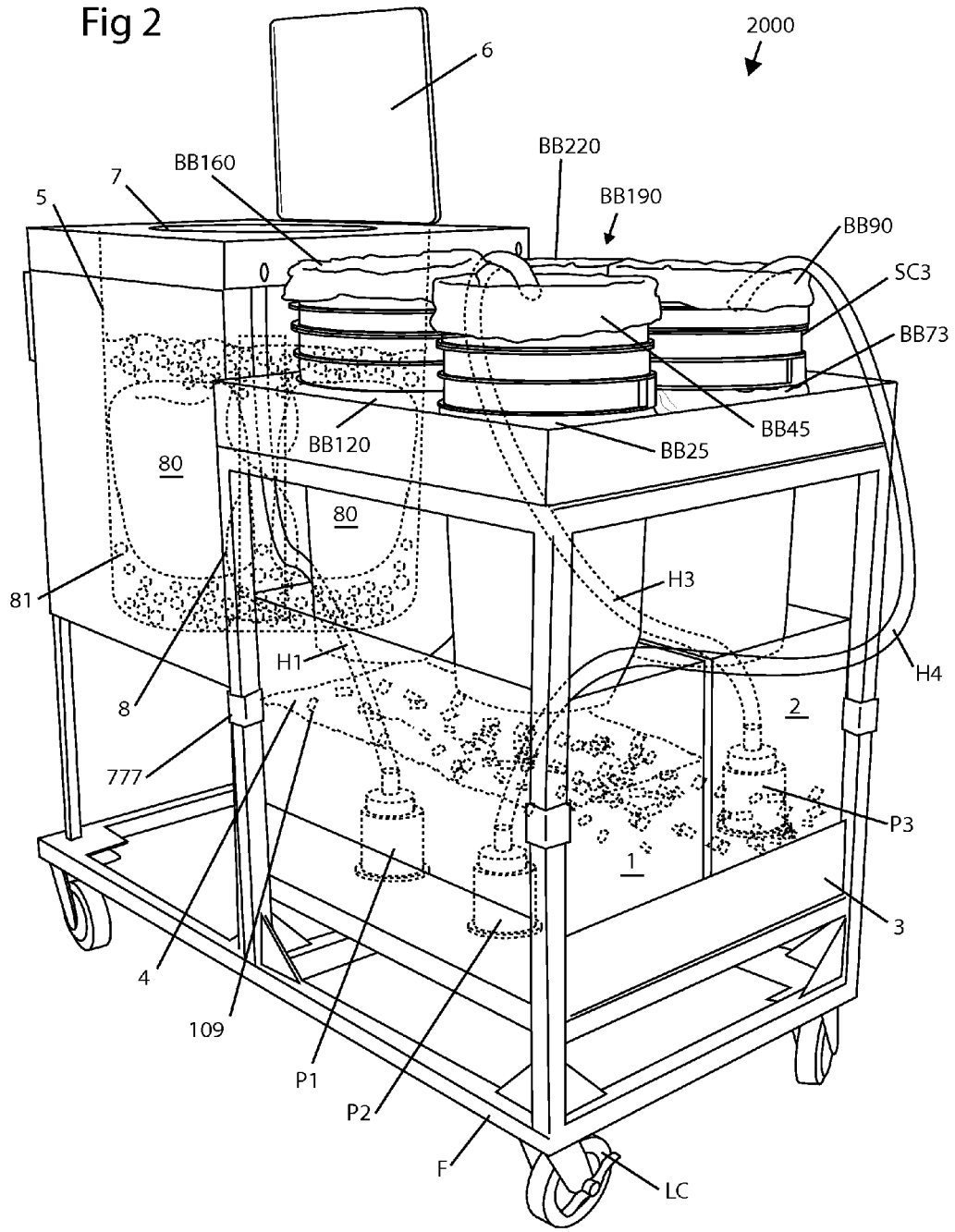
FIG. 2 is a side perspective view of the preferred embodiment agitator system.

Referring first to FIG. 1 the steps to run the agitator 2000 of FIG. 2 are shown. Block 1a shows filling both reservoirs 1 and 2 with ice. Block 1 shows filling reservoir 1 with square ice cubes 10 and water 4. Block 2 shows optionally placing dry ice blocks 110 around the reservoirs 1, 2 on base 3 of agitator 2000, see FIG. 11.

Figure 8:
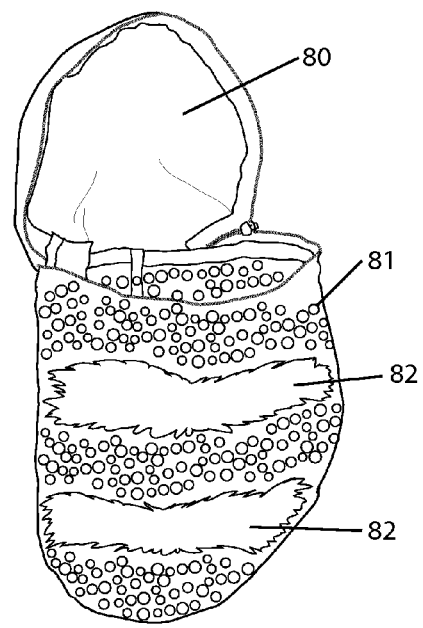
FIG. 8 is a side elevation view of a filled up agitator bag shown in FIG. 4.

Block 3 refers to FIG. 8 where screen bag 80 is filled with round ice cubes 81 and raw plants 82. Block 4 shows putting round ice cubes 81 into the agitator tub 5. Block 5 shows placing one to four screen bags 80 into tub 5 intermixed with round ice cubes 81 on top of screen bags 80, then closing lid 6 on the open top 7 of the tub 5.

In block 7 the pump P1 pumps the water 4 from reservoir 1 into tub 5. Block 8 shows the tub 5 is full, and the pump P1 is off. Block 9 shows the agitator blade 8 agitating back and forth for a selected time. The best mode uses a GE® 3.5 cubic foot king size Model WDRR 2500 kww clothes washing machine for the agitator with a modified controller.

Figure 10:
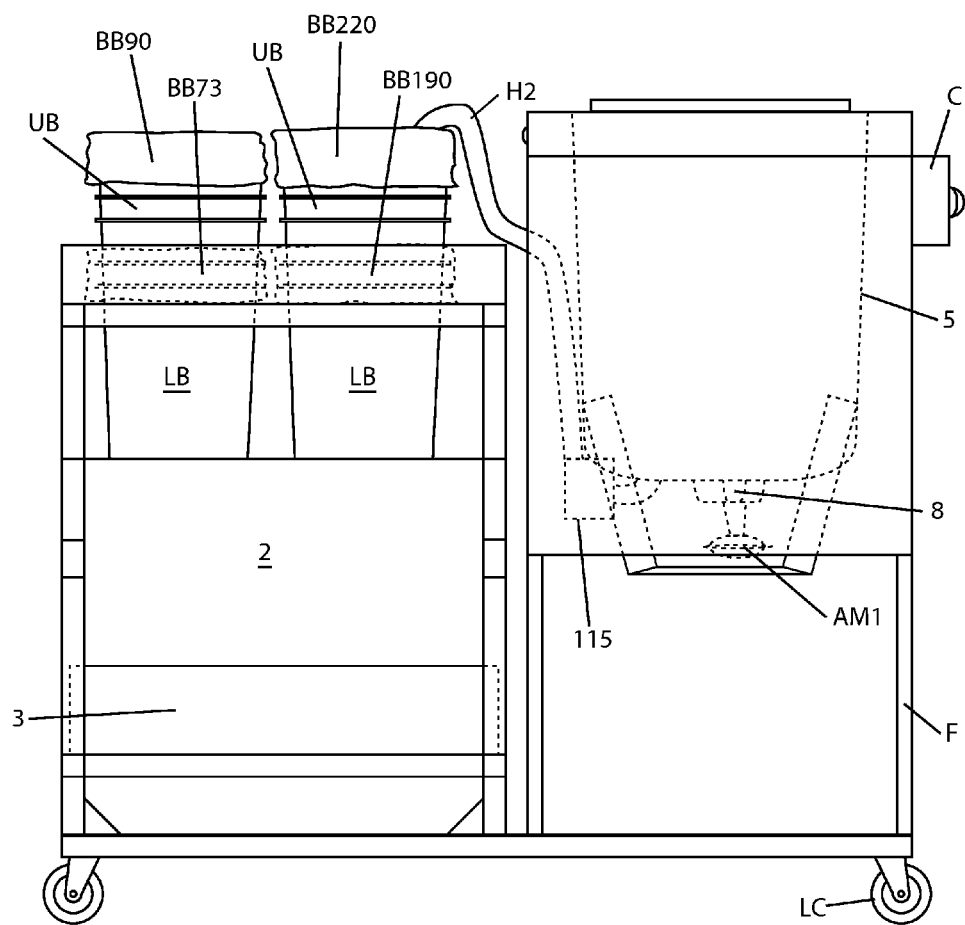
FIG. 10 is a left side elevation view of the system shown in FIG. 9.

In Block 10, as shown in FIGS. 10, 11 agitator drain pump 115 empties the tub 5 into a selected strainer column, in this case strainer column SC 1 which has a top filter of 220 micron and a bottom filter of 190 micron. In Block 11 the buckets and filters in strainer column SC1 are shaken and strained (either by hand or by further motorized elements not shown). Some residue is now caught in filters 220 and 190. The process water is now collected in reservoir 2.

In Block 12 pump P3 pumps the process water from reservoir 2 via hose H3 into strainer column SC2 which has filters of 160 and 120 micron. In Block 13 the 160 and 120 micron filters are shaken and strained (either by hand or by further motorized elements not shown).

In Block 14 the controller C is programmed to either repeat an agitation cycle from reservoir 1 back through tub 5, shown in Blocks 15, 16. More ice may be added in this repeat agitation cycle as shown by Blocks 17, 18. FIGS. 13, 14 show a repeat of FIGS. 11, 12.

If no further agitation were selected in controller C, then Block 19 indicates no further agitation. The filtering continues in FIG. 15 and Block 20 with pump P2 via hose H4 pumping the process water 4 into strainer column SC3 which has a 90 and 73 micron bag set are shaken and strained by hand (or with motorized elements not shown). The process water 4 now resides in reservoir 2.

Block 22 shows pump P3 pumping the process water from reservoir 2 into strainer column SC4. Strainer column Sc4 has the finest filters of 45 and 25 micron. The process water 4 now resides in reservoir 1. The hose H3 was moved (either manually or by a robotic arm not shown) from strainer column SC2 to strainer column SC4 for this process Block 22.

The controller c can be set to repeat an agitation cycle as shown by Blocks 23 and 15. The operator makes the decisions of how many agitator cycles to run based on the volume and type of raw plant material 82 shown in FIG. 8 and the number of screen bags 80 used.

Block 24 indicates the end of a complete process cycle. For processing about five pounds of marijuana into hashish, this could have used four screen bags 80 and taken two to three hours.

Figure 17:
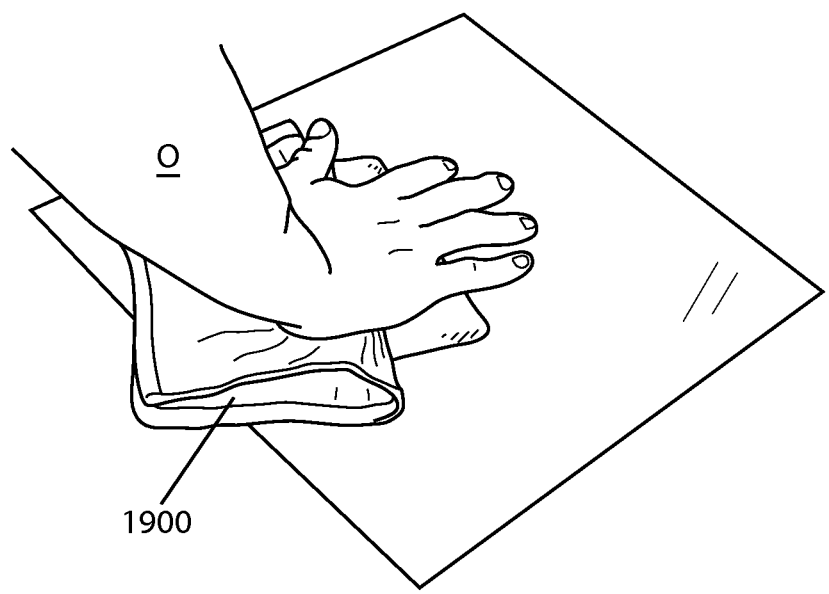
FIG. 17 is a top perspective view of a hand pressing drying step.
Figure 18:
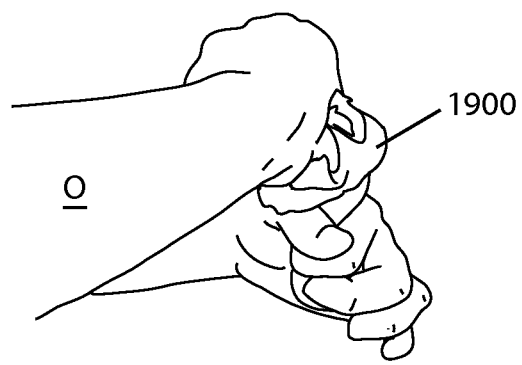
FIG. 18 is the same view as FIG. 17 showing a hand squeeze drying step.
Figure 19:
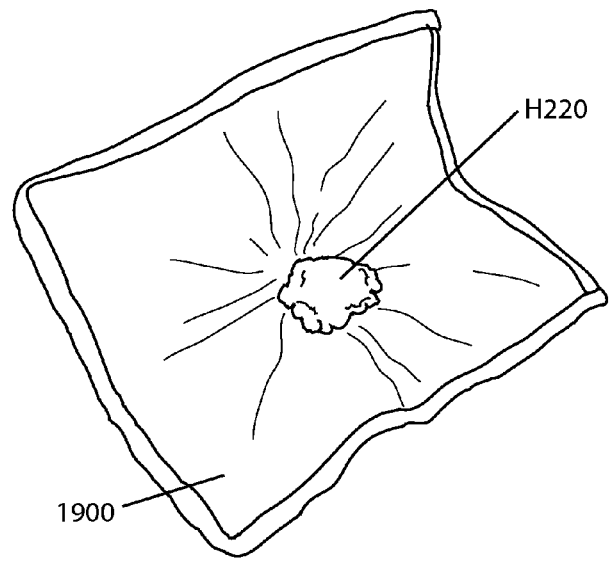
FIG. 19 is a top perspective view of one filtered final product.
Figure 20:
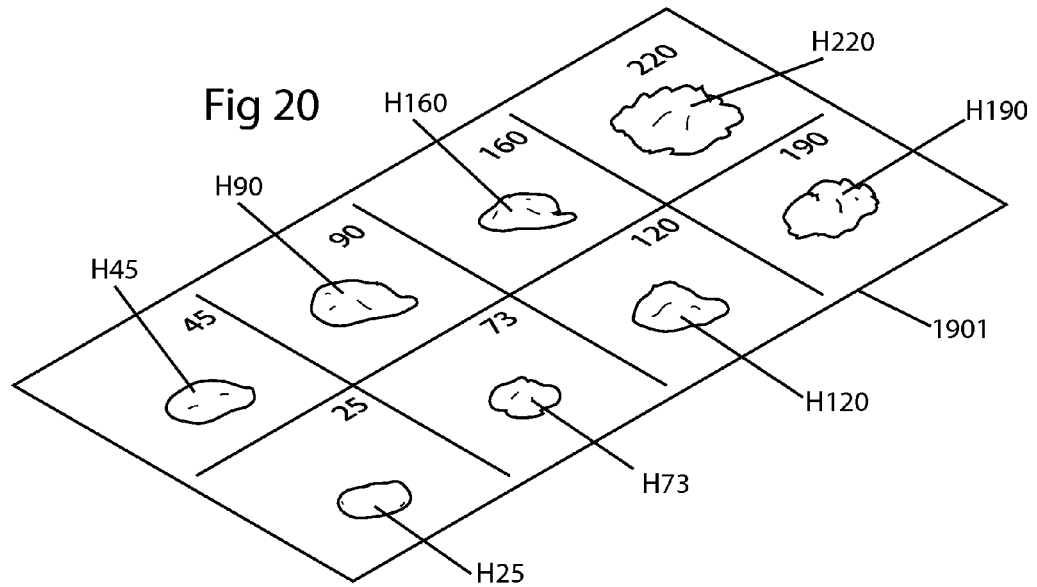
FIG. 20 is a top perspective view of an eight diameter harvest.

Block 25 shows the (usually manual) drying process illustrated in FIGS. 17, 18. The operator O has removed each of the eight filter bags and press dries each filter (220, 190, 160, 120, 90, 73, 45, 25 micron) contents after scraping each filter contents into separate sponge pad 1900 after drying the filter contents to a 220 micron hashish H220.

The hashish H200 is weighed and placed on a packaging grid 1901. The lowest diameter hashish, H25, has the finest quality pollen of the flower, and is the most valuable. This step is shown as Block 26.

Figure 3:
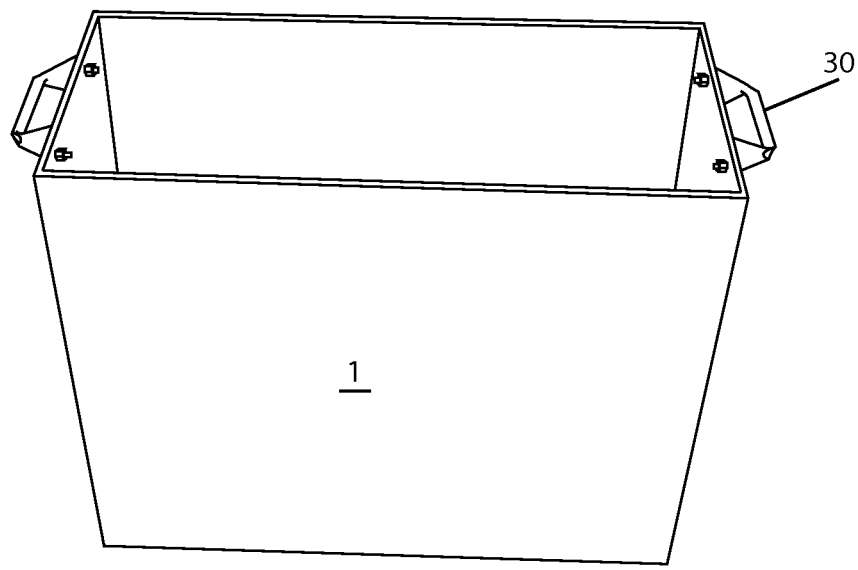
FIG. 3 is a top perspective view of one recycle reservoir.

In FIG. 3 the preferred reservoir 1 is made of food grade plastic with about a twenty five gallon capacity. Handles 30 provide ease of handling for cleaning and setup.

Figure 4:
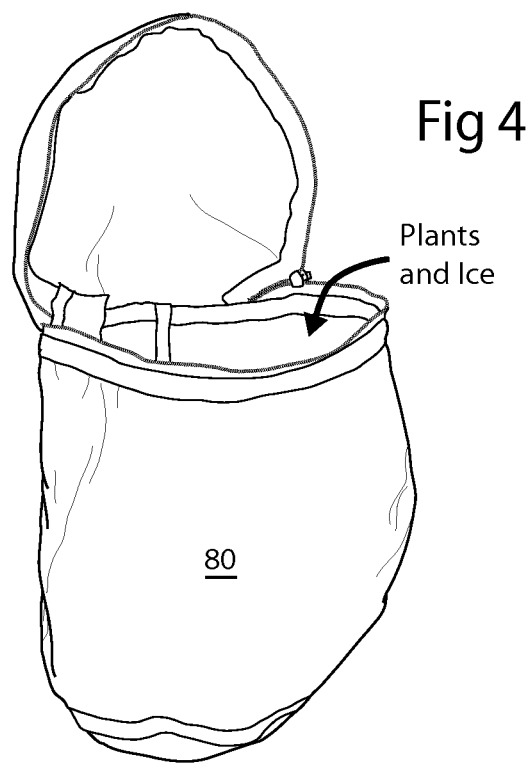
FIG. 4 is a side perspective view of the bag for the agitator.

In FIG. 4 the best mode uses a commercial Bubble Bag™ kit made in Vancouver, B.C. Canada. Nylon sidewalls are nylon, 800 thread count for the 5 and 20 gallon bags. On gallon bags are 400 thread count. Operators can place any variety of small bags inside larger bags to fill the tub 5.

Figure 9:
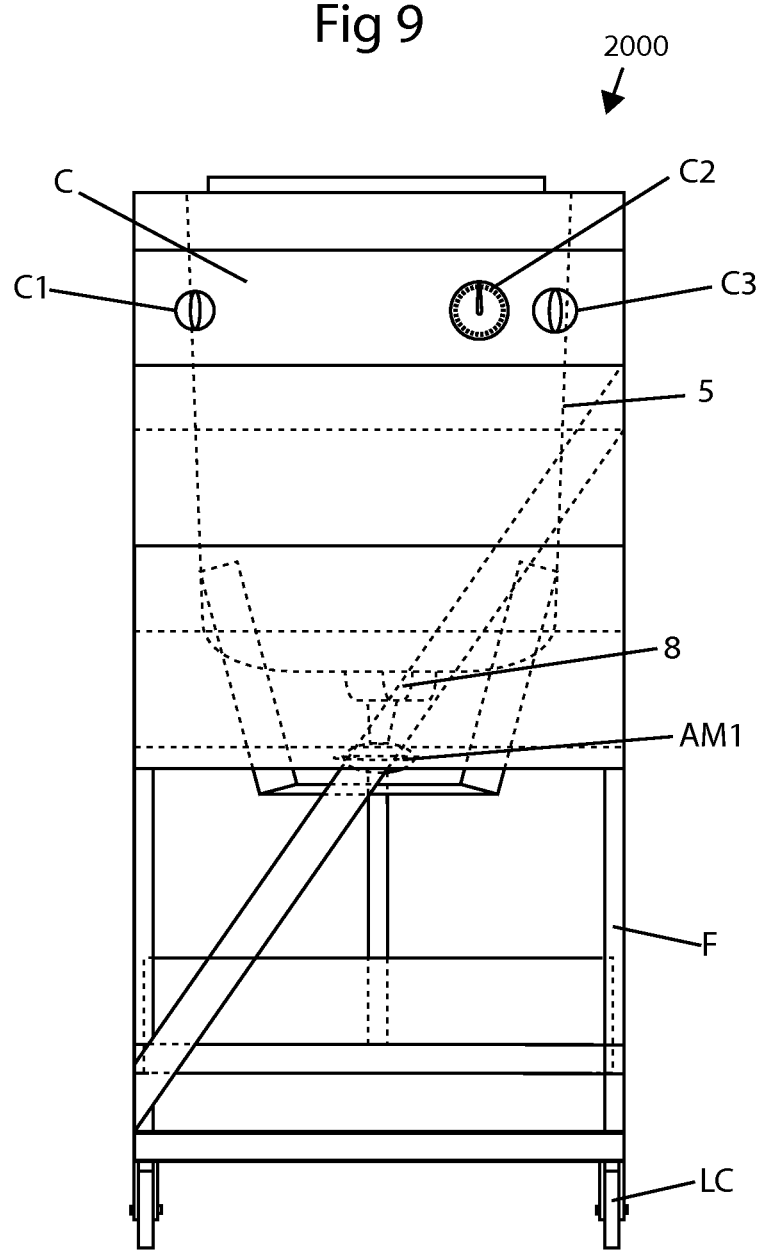
FIG. 9 is a front elevation view of the system shown in FIG. 2.

The frame F shown in FIGS. 2, 9, 10 has locking casters LC. The base pan 3 may be aluminum. The framing may be tubing stock nominally 1¾"×1¾"×⅛". A height of about 41 inches above the locking casters LC is adequate. A longitudinal length of about 58 inches is adequate. Joinder collars 777 allow for easy breakdown of frame F for shipping. The pumps P1, P2, P3 may be Flotec utility pump model FPOS 1250x.

Figure 5:
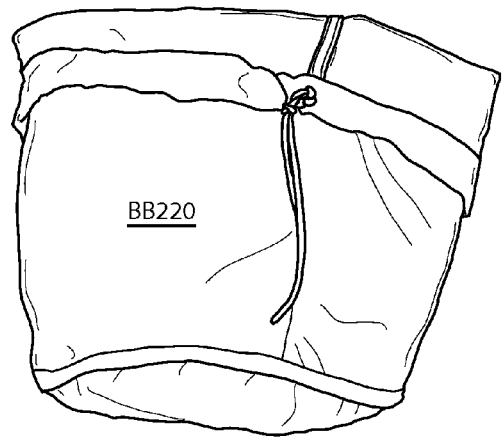
FIG. 5 (prior art) is a side perspective view of a Bubble Bag™ one bag of eight in the kit is used to create eight varying diameter pollen yields.
Figure 6:
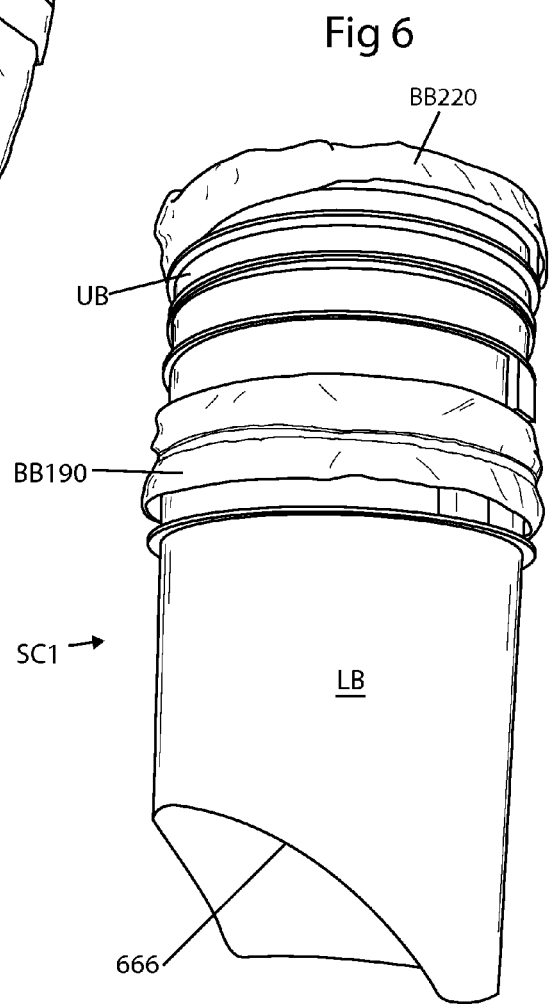
FIG. 6 is a side elevation view of one stack of two filter bags in two pass through buckets.
Figure 7:
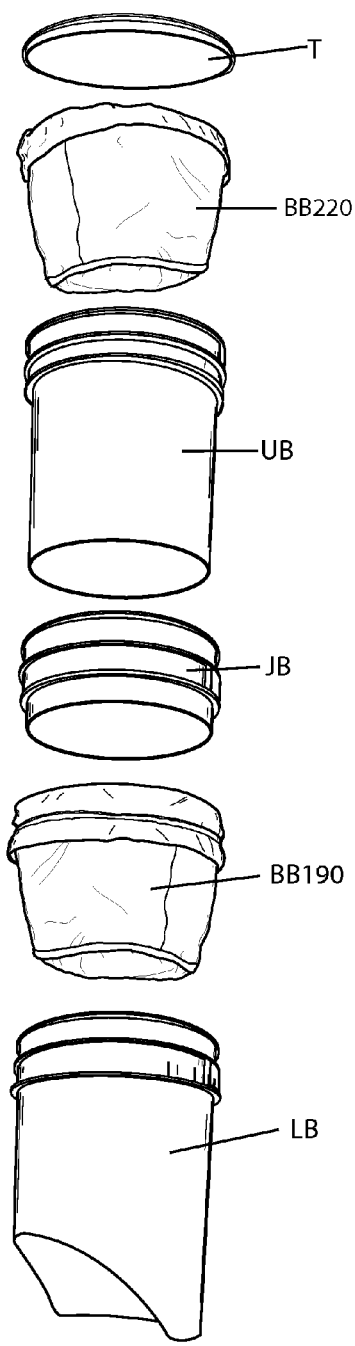
FIG. 7 is an exploded view of FIG. 6.

FIGS. 5, 6, 7 show that the upper buckets UB are bottomless. Lower buckets LB are also bottomless but have a cutout 666 to provide hand access to the lower bag, bag BB190 of FIG. 6. The bags are prior art Bubble Bags labeled BB220, BB190, BB160, BB120, BB90, BB73, BB45 and BB25, indicating the micron filter diameters. A top T may be used. A joinder bucket JB connects and spaces the upper bucket UB from the lower bucket LB forming a strainer column SC1 in FIGS. 6, 7 and allows the upper bucket UB to slide up and down in the down bucket B.

In FIG. 9 the controller C has an agitation speed control C1, a timer C2, and function select C3 such as agitate or drain. The agitator motor AM1 is shown.

Typical Process Time Line

Setup time is 45 minutes for ice and water and raw plant material prep. Depending on what mode it is on varies the agitation time. There are three mode choices being capsulate, heavy and light.

In capulate mode there are three separate agitation cycles that last 8 minutes with a 2 minute stand still between cycles. Then the water is pushed out the agitator hog and is drained through the 220 mc and 190 mc bag set into reservoir 2. The water draining through this set of bags takes 3 minutes. Once complete the water is pumped from the reservoir 2 through the 160 mc and 120 mc bags set into the reservoir 1. This process takes 5 minutes. Once complete the water is pumped back into the agitator for one more agitation. This agitation takes 8 minutes, and then the water is drained back through the 220 mc and 190 mc bag set taking the same amount of time as before. This is the last time the water is agitated through the agitator. Once complete the water is pumped from the reservoir and filtered through the 90 mc and 73 mc bags set into reservoir 2. This process takes 10 minutes. Once complete the water is pumped from reservoir 2 and filtered through the 45 mc and 25 mc bag set into reservoir 1 and this takes 15 minutes. Depending on the quality of the product captured, the operator would decide on how many times he would run it through the agitator.

In the other two modes (light and heavy) the filtration times are the same. The only thing that changes is how long the plant material is agitated for. In the heavy cycle there is one agitation for 20 minutes, then the water is pumped out through the 220 and 190 bags set resulting in the same time filtration through the bags. In the light cycle the agitation time changes to 10 minutes, and the rest of the filtration process is the same. Clean up take 45 minutes.

Referring next to FIG. 21 a second embodiment agitator 2100 requires more manual labor. Only two strainer columns, Sc5 and Sc6, are used with the end result of eight different filters the same as agitator 2000. Only two submersible pumps, P1 and P3 are used. The same two reservoirs 1, 2 and agitator tub 5 are used. The controller C2 has a different control cycle to handle fewer pumps.

In operation we fill reservoir 1 with ice water. Next we fill reservoir 2 with ice. The agitator tub 5 is filled the same as shown in FIG. 1. The agitation cycles start with drawing the agitator tubs into strainer column Sc6, thus filling reservoir 2 with the process water. Next pump P3 pumps the reservoir 2 process water into strainer column SC5. The operator can choose to re-pump the reservoir 1 process water back into the agitator tub 5 and repeat the cycle. All other scraping the filter and drying and separating the eight diameter harvests are the same. However, more manual labor is needed to keep process water flowing through the six filters in strainer column SC 5. Frame FF may be less suited for breakdown for shipping and less costly.

The drying of the plant extracts produced by the present invention uses known methods. There are air drying, hand pressing (see FIG. 17), and mechanical pressing methods known. Well suited for this application is the mechanical press called the Jackpuck™, square two ton, which is located at P.O. BOX 55043 R.P.O FAIRMOUNT, MONTREAL, QUEBEC CANADA H2T3E2 Ph. 1 514.272.7171.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A plant pollen separator comprising:
a powered agitator;
a controller controlling the powered agitator;
said powered agitator having a tub and a drain pump;
a first reservoir having a first pump to pump fluid from the first reservoir to the tub;
a first and a second strainer column set to drain into the first reservoir;
said first reservoir having a second pump to pump the fluid to a second reservoir via a third and fourth strainer column;
said third and fourth strainer columns each having at least one filter;
wherein placing a raw plant material into the tub with ice and water and having the controller activate an agitation cycle causes plant debris to enter the water in the tub forming a process fluid;
wherein the controller directs the agitator drain pump to pump the process fluid into the third strainer column, the process fluid ending in the second reservoir;
wherein the controller directs the second pump in the first reservoir to direct the process fluid into the fourth strainer column, the process fluid ending in the second reservoir; and
wherein the controller directs the third pump in the second reservoir to direct the process fluid into the second strainer column.

2. The separator of claim 1, wherein the strainer columns are mounted on a frame above the reservoirs.

3. The separator of claim 2, wherein the powered agitator and controller are mounted on the frame.

4. The separator of claim 3, wherein each strainer column further comprises an upper bottomless bucket atop a lower bottomless bucket, each bucket having a filter bag with a different micron mesh.

5. The separator of claim 4, wherein a joinder collar separates the upper bucket from the lower bucket.

6. The separator of claim 1, wherein a hose from the second pump is moveable between the third and fourth strainer columns.

7. The separator of claim 6, wherein a hose from the third pump is movable between the first and second strainer column.

8. The separator of claim 2, wherein the frame has an ice tray under the reservoirs.

9. A plant pollen separator comprising:
a frame supporting a powered agitator that has a tub and a drain pump;
a first reservoir on the frame;
said first reservoir having a pump to fill the tub;
a second reservoir on the frame;
said second reservoir having a pump to fill the first reservoir via a first strainer column over the first reservoir;
said tub drain pump having a hose entering a second strainer column over the second reservoir;
each of the strainer columns having at least one mesh filter;
wherein the agitator, drain pump from the tub, and pumps of the first and second reservoirs are controlled by a controller on the frame;
wherein placing a raw plant material into the tub with ice and water and having the controller activate an agitation cycle causes plant debris to enter the water in the tub forming a process fluid; and
wherein the controller directs the agitator drain pump and first and second reservoir pumps to pump the process fluid into either the first or second strainer column or tub.

10. The separator of claim 9, wherein the first strainer column has six mesh filters, and the second strainer column has two mesh filters.

11. A plant pollen separator comprising:
a frame supporting a powered agitator that has a tub and a drain pump;
a first reservoir on the frame;
said first reservoir having a pump to fill the tub;
a second reservoir on the frame;
said second reservoir having a pump to fill the first reservoir via a first strainer column over the first reservoir;
said tub drain pump having a hose entering a second strainer column over the second reservoir;
each of the strainer columns having at least a one micron mesh filter;
wherein the first strainer column has six mesh filters, and the second strainer column has two mesh filters;
wherein each mesh filter further comprises a filter bag supported in a bucket.

12. A plant pollen separator comprising:
a powered agitator having a tub and a drain pump with a hose that feed a first strainer column on a first reservoir; and
said first reservoir having a pump with a hose that feeds a second strainer column on a second reservoir;
wherein a controller controls the powered agitator and pumps;
wherein placing a raw plant material into the tub with ice and water and having the controller activate an agitation cycle causes plant debris to enter the water in the tub forming a process fluid;
wherein the controller directs the drain pump to pump process fluid into the first strainer column and the first reservoir pump to the second strainer column.

13. The separator of claim 12, wherein each strainer column has a filter.

14. The separator of claim 13, wherein the filter in the first strainer column has a different micro mesh than the filter in the second strainer column.

15. The separator of claim 12, wherein the first strainer column has two filters.

16. The separator of claim 15, wherein the second strainer column has six filters.

17. A method to separate varying diameter plant debris from a plant, the method comprising the steps of:
programming a controller to control an agitation cycle in a tub;
programming said controller to control a drain pump in the tub, and a first and a second reservoir pump;
agitating a plant in the tub with ice to create a process fluid;
pumping the process fluid to the first reservoir through a first filter and then, via a second filter, to a second reservoir; and
removing plant debris from the first and second filters.

18. The method of claim 17, further comprising the step of pumping the process fluid from the second reservoir back into the first reservoir via a third filter.

19. The method of claim 18, further comprising the step of pumping the process fluid from the first reservoir back into the second reservoir via a fourth filter.

* * * * *